Aug. 7, 1945.                J. C. WOOD                2,381,021
                              AIRPLANE
                        Filed Sept. 24, 1943            3 Sheets-Sheet 1

Aug. 7, 1945.  J. C. WOOD  2,381,021
AIRPLANE
Filed Sept. 24, 1943   3 Sheets-Sheet 3

Inventor
Jacob C. Wood
By Clarence A. O'Brien
and Harvey B. Jacobson
Attorneys

Patented Aug. 7, 1945

2,381,021

UNITED STATES PATENT OFFICE 2,381,021

AIRPLANE

Jacob C. Wood, Duke, Ala.

Application September 24, 1943, Serial No. 503,689

2 Claims. (Cl. 244—60)

The present invention relates to new and useful improvements in airplanes, and has for its primary object to provide, in a manner as hereinafter set forth, a machine of this character comprising novel propulsion means.

Other objects of the invention are to provide an airplane of the character described which will be comparatively simple in construction, strong, durable, safe and reliable in operation, and which may be produced at low cost.

All of the foregoing and still further objects and advantages of the invention will become apparent from a study of the following specification, taken in connection with the accompanying drawings wherein like characters of reference designate corresponding parts throughout the several views, and wherein:

Figure 4 is a vertical sectional view through one of the wings.

Figure 1:
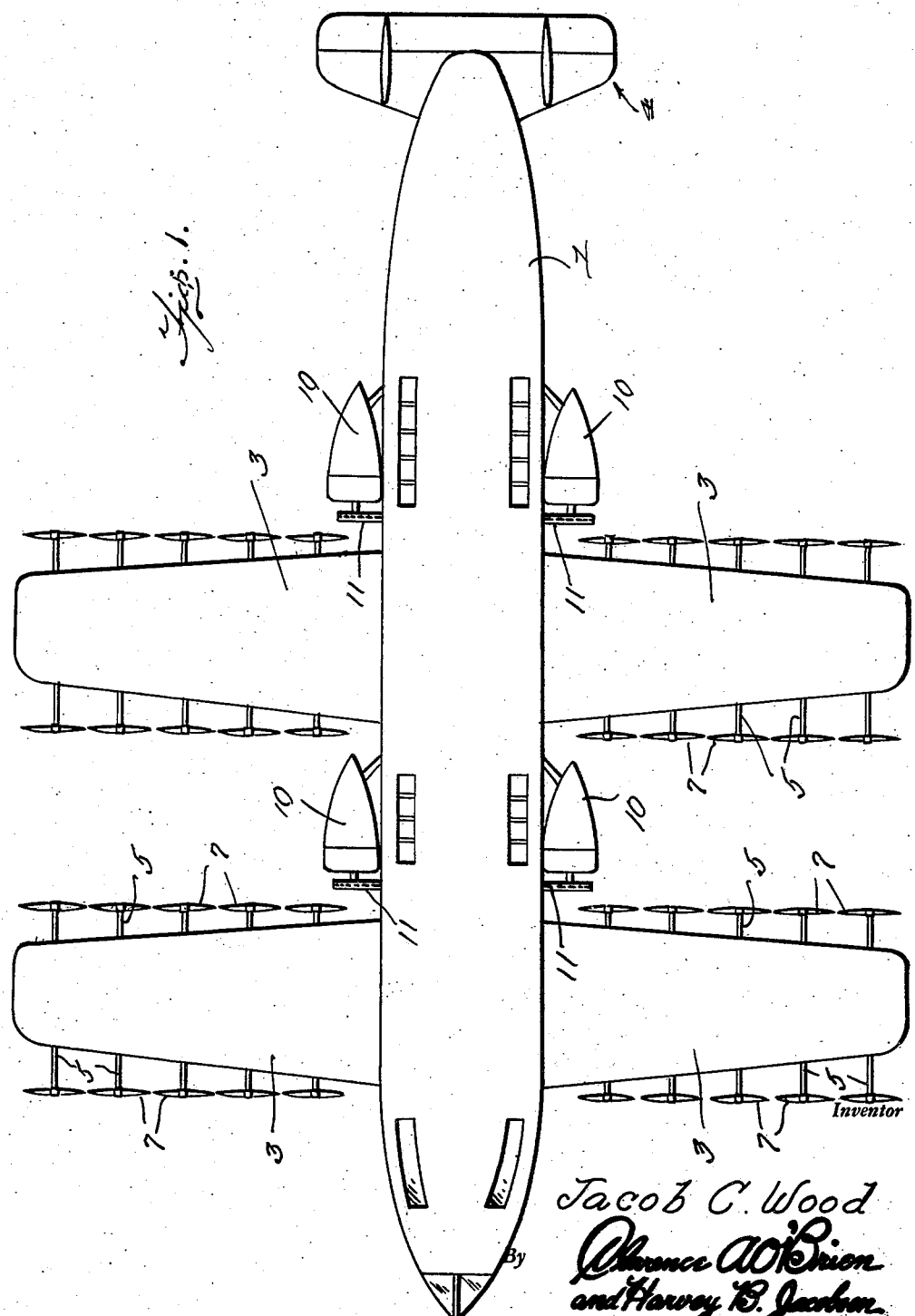
Figure 1 is a top plan view of an airplane constructed in accordance with the present invention.
Figure 2:
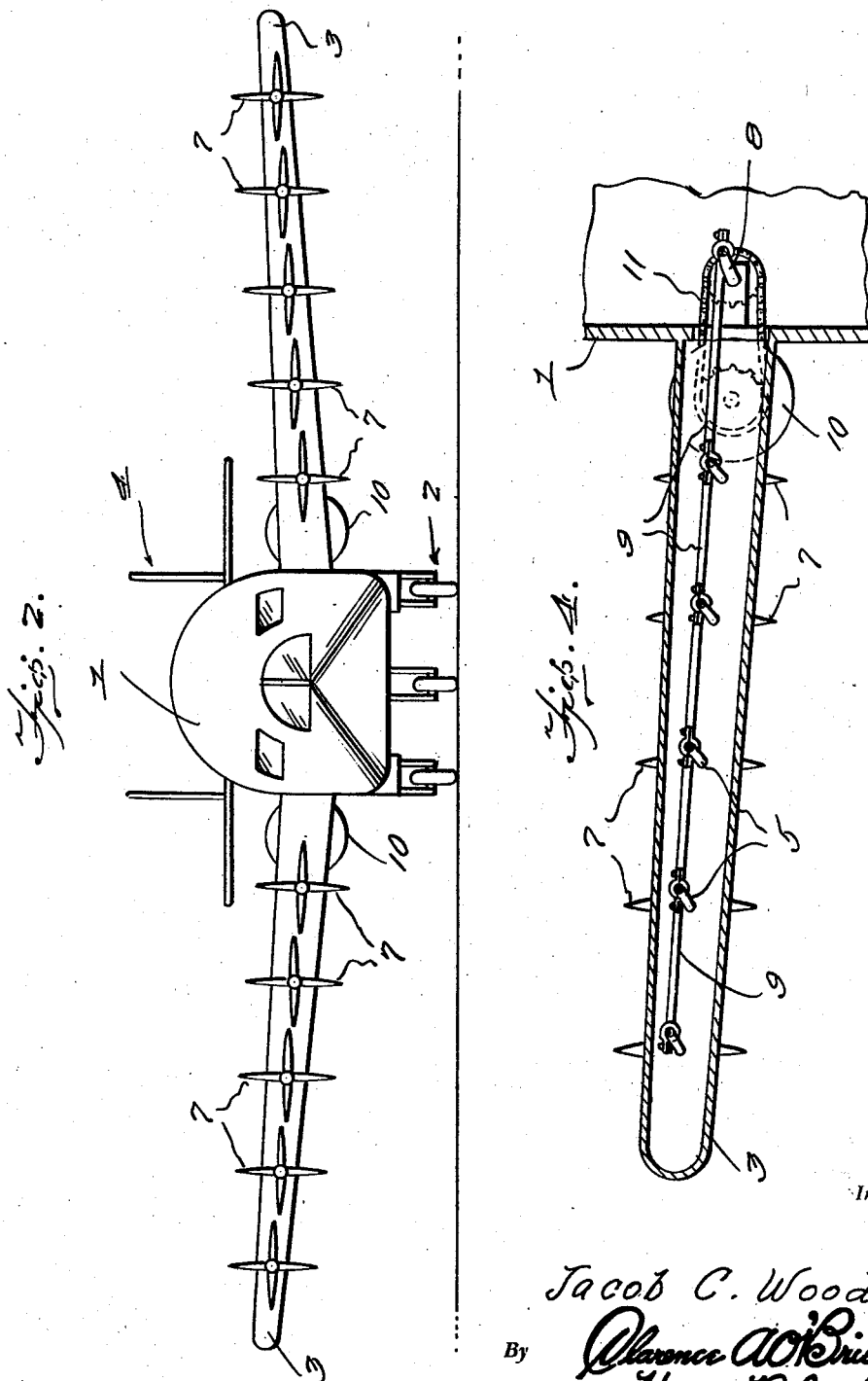
Figure 2 is a view in front elevation thereof.

Referring now to the drawings in detail, it will be seen that the embodiment of the invention which has been illustrated comprises a body or fuselage 1, which fuselage may be of any desired construction and dimensions. The fuselage 1 is provided with a suitable landing gear which is designated generally by reference numeral 2. Pairs of wings 3 project laterally from the fuselage 1 at longitudinally spaced points. The usual tail assembly 4 is provided on the rear end portion of the fuselage 1.

Mounted longitudinally in each wing 3 is a series of spaced, parallel crank shafts 5 which emerge from the leading and trailing edges of the wing. The crank shafts 5 are journaled in bearings 6. Propellers 7 are fixed on the end portions of the crank shafts 5 forwardly and rearwardly of the wing.

Figure 3:
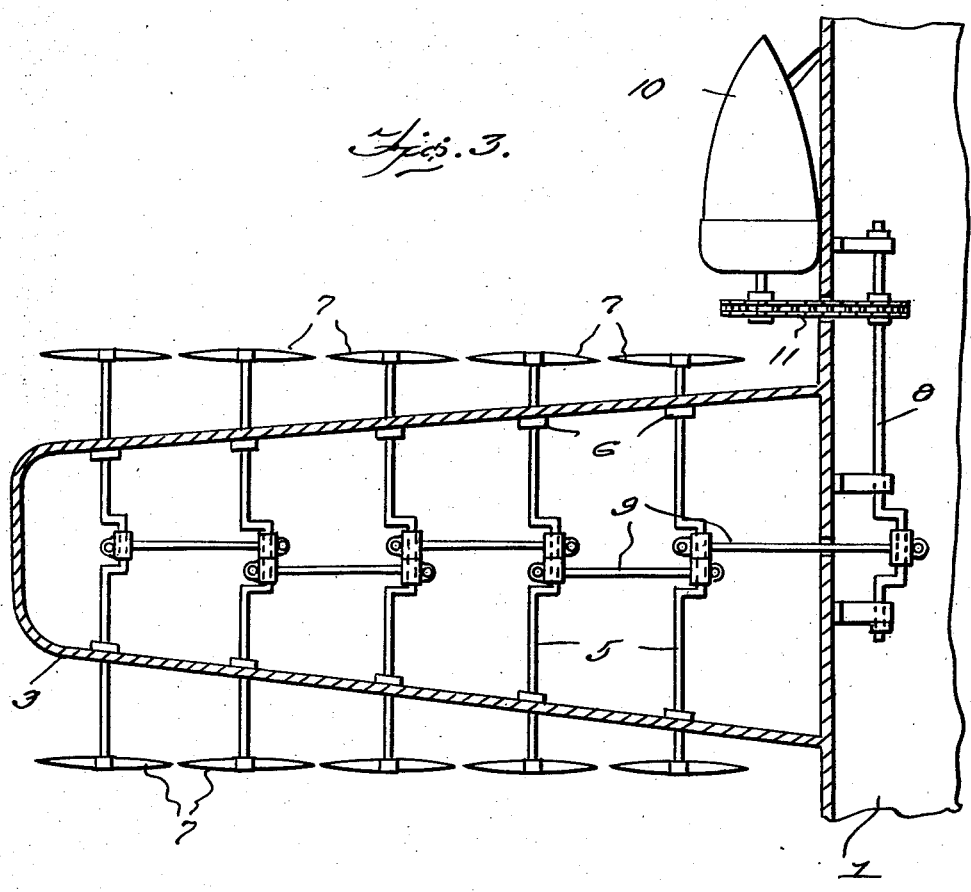
Figure 3 is a view in horizontal section through one of the wings and a portion of the fuselage.
Figure 5:
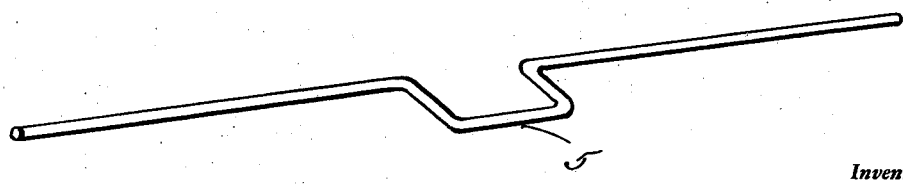
Figure 5 is a detail view in perspective of one of the propeller shafts.

In the embodiment shown, drive crank shafts 8 are rotatably mounted in the fuselage 1 adjacent the wings 3. Connecting rods 9 operatively connect the crank shafts 5 and 8 for rotation in unison. High-speed outboard engines 10 are mounted on the fuselage 1 rearwardly of the wings 3, which engines may be cooled in any suitable manner. The engines 10 drive the crank shafts 8 through chain and sprocket connections 11. This is shown to advantage in Figure 3 of the drawings.

It is thought that the operation of the airplane will be readily apparent from a consideration of the foregoing. Briefly, with the engines 10 in operation, the driving crank shafts 8 are actuated through the chain and sprocket connections 11. The crank shafts 5 are driven in unison from the crank shafts 8 through the connecting rods 9 for turning the propellers 7. Of course, the front propellers on the crank shafts 5 pull and the rear propellers on said crank shafts 5 push. The construction and arrangement is such that the machine will be capable of exceptionally high speed. Any suitable means may be employed for lubricating the engines and other moving parts.

It is believed that the many advantages of an airplane constructed in accordance with the present invention will be readily understood, and although a preferred embodiment of the machine is as illustrated and described, it is to be understood that changes in the details of construction and in the combination and arrangement of parts may be resorted to which will fall within the scope of the invention as claimed.

What is claimed is:

1. An airplane comprising a fuselage, pairs of wings projecting from the fuselage at longitudinally spaced points, series of spaced, parallel crank shafts mounted longitudinally in the wings and emerging from the leading and trailing edges thereof, propellers fixed on the end portions of the crank shafts, rods connecting the crank shafts for operation in unison, and means for actuating the crank shafts, said means including crank shafts rotatably mounted in the fuselage adjacent the wings, and engines mounted outboard on the fuselage and operatively connected to the second-named crank shafts.

2. An airplane comprising a fuselage, wings mounted on said fuselage, spaced crank shafts mounted in each wing parallel with the longitudinal axis of the fuselage, propellers on said crank shafts, a crank shaft mounted in the fuselage adjacent each side of the latter and parallel with the longitudinal axis of the fuselage, an engine mounted on each side of the fuselage outside the latter and rearwardly of each wing, means operatively connecting said engine to the second-named crank shaft, a rod connecting the second-named crank shaft to one of the first-named crank shafts, and rods connecting said first-named crank shafts for operation in unison.

JACOB C. WOOD.